United States Patent [19]

Friberg

[11] Patent Number: 5,760,311

[45] Date of Patent: Jun. 2, 1998

[54] CAPACITIVE PRESSURE TRANSDUCER WITH REFERENCE CAPACITOR

[75] Inventor: David J. Friberg, Nepean, Canada

[73] Assignee: CAL Corporation, Ottawa, Canada

[21] Appl. No.: 754,171

[22] Filed: Nov. 25, 1996

[51] Int. Cl.⁶ ............................................. G01L 9/12
[52] U.S. Cl. ................................................ 73/724; 72/718
[58] Field of Search .......................... 73/718, 724, 708; 361/283.3, 283.4, 283.1

[56] References Cited

U.S. PATENT DOCUMENTS

| | | | |
|---|---|---|---|
| 3,354,721 | 11/1967 | Fiske | 73/708 |
| 4,572,000 | 2/1986 | Kooiman | 361/283 |
| 4,603,371 | 7/1986 | Frick | 73/724 |
| 4,612,812 | 9/1986 | Broden | 73/718 |
| 4,680,971 | 7/1987 | Kavli et al. | 73/718 |
| 4,689,999 | 9/1987 | Shkedi | 73/708 |
| 4,691,574 | 9/1987 | Delatorre | 361/283 |
| 4,730,496 | 3/1988 | Knecht | 73/724 |

*Primary Examiner*—William L. Oen
*Attorney, Agent, or Firm*—Pascal & Associates

[57] ABSTRACT

A capacitive pressure transducer comprising a first capacitor having a plate which is movable under the influence of pressure and a fixed plate, and a second capacitor having a pair of fixed plates, one plate of the second capacitor and the fixed plate of the first capacitor being fixed to a common support, a first structure for moving the movable plate, a support structure for a second plate of the second capacitor, masses of the support structure for the second plate and of the first structure for moving the movable plate being approximately equal.

14 Claims, 1 Drawing Sheet

CAPACITIVE PRESSURE TRANSDUCER WITH REFERENCE CAPACITOR

FIELD OF THE INVENTION

This invention relates to a high accuracy fluid pressure measuring device.

BACKGROUND TO THE INVENTION

Fluid pressure can be measured by displacing a diaphragm, which bends a piezoelectric crystal, stretches a strain gauge resistor, or moves one plate of a capacitor relative to another. At least in the latter case of the capacitor pressure measuring device, accuracy of measurement is affected by ambient temperature changes, which can cause the distance of one capacitor plate from the other to change. The problem is not trivial, since full scale deflection of one plate relative to the other can be 0.0005 inches, i.e. 13 μm.; and accuracy of 2.54 nm is a reasonable objective. Such pressure gauges are required for example to measure the amount of fuel remaining in steering thruster fuel tanks of spacecraft.

U.S. Pat. No. 4,262,540 describes a pressure transducer which recognizes that compensation must be made for inaccuracies caused by ambient temperature changes. The structure uses deflection of a conductive diaphragm relative to a fixed plate to form a first capacitor pressure measurement device, and provides another conductive support which is fixed relative to another capacitor plate mounted on the support for the first capacitor plate, to form another capacitor of similar value as the first. The second capacitor is used as a compensating capacitor. The concept is that with changes in environmental factors such as temperature the compensating capacitor will vary in capacitance similar to the first, and therefore can be used in a circuit to nullify changes caused by the environmental factors which affect both capacitors.

However it has been found that the structure described in the aforenoted patent contains certain problems. One problem is that extreme deflection of the diaphragm can cause creep, or permanent distortion of the diaphragm, thus making pressure measurement incorrect. Extreme deflection can also cause short-circuiting of the deflecting diaphragm.

Another problem is that the structure does not provide compensation to the required degree of accuracy, in order to achieve the pressure gauge accuracy noted above.

SUMMARY OF THE INVENTION

The present invention provides means to safeguard a compensating form of capacitor pressure measurement device in order to avoid creep, distortion, and short circuiting of the capacitor, under extreme pressure loads. It also provides compensation more accurately than the above-described structure.

Increased accuracy is achieved by making the masses of the deflecting structure and of the compensating structures to be as similar as possible. An unique structure is provided to provide this mass equivalence.

Avoidance of creep, distortion and short circuiting of the capacitor is achieved by providing guards or stops, which form barriers against the diaphragm distorting more than a predetermined distance.

In accordance with an embodiment of the present invention, a capacitive pressure transducer is comprised of a first capacitor having a plate which is movable under the influence of pressure and a fixed plate, and a second capacitor having a pair of fixed plates, one plate of the second capacitor and the fixed plate of the first capacitor being fixed to a common support, a first structure for moving the movable plate, a support structure for a second plate of the second capacitor, masses of the support structure for the second plate and of the first structure for moving the movable plate being approximately equal.

In accordance with another embodiment, a capacitive pressure transducer is comprised of a sealed container, a diaphragm sealed to and supported by sides of the container defining a closed plenum region between the diaphragm and an end wall of the container, a fluid inlet to the plenum, a first fixed support supported by sides of the container parallel to the diaphragm on a side opposite to the plenum, a pair of adjacent capacitor plates facing each other and fixed to the first fixed support and the diaphragm, and a second pair of adjacent capacitor plates of similar size as the first pair of capacitor plates facing each other and supported by the first fixed support and a second end wall of the container opposite the first wall, the mass of structure supporting a capacitor plate fixed to the diaphragm being approximately equal to the mass of structure supporting a capacitor plate supported by the second end wall of the container.

BRIEF INTRODUCTION TO THE DRAWINGS

A better understanding of the invention will be obtained by considering the detailed description below, with reference to the following drawings, in which:

FIG. 1 is a crossection of the pressure transducer device in accordance with a preferred embodiment of the invention, and FIG. 2 is a cross-section of a guard or stop structure.

DETAILED DESCRIPTION OF PREFERRED EMBODIMENT

Figures 1, 2:
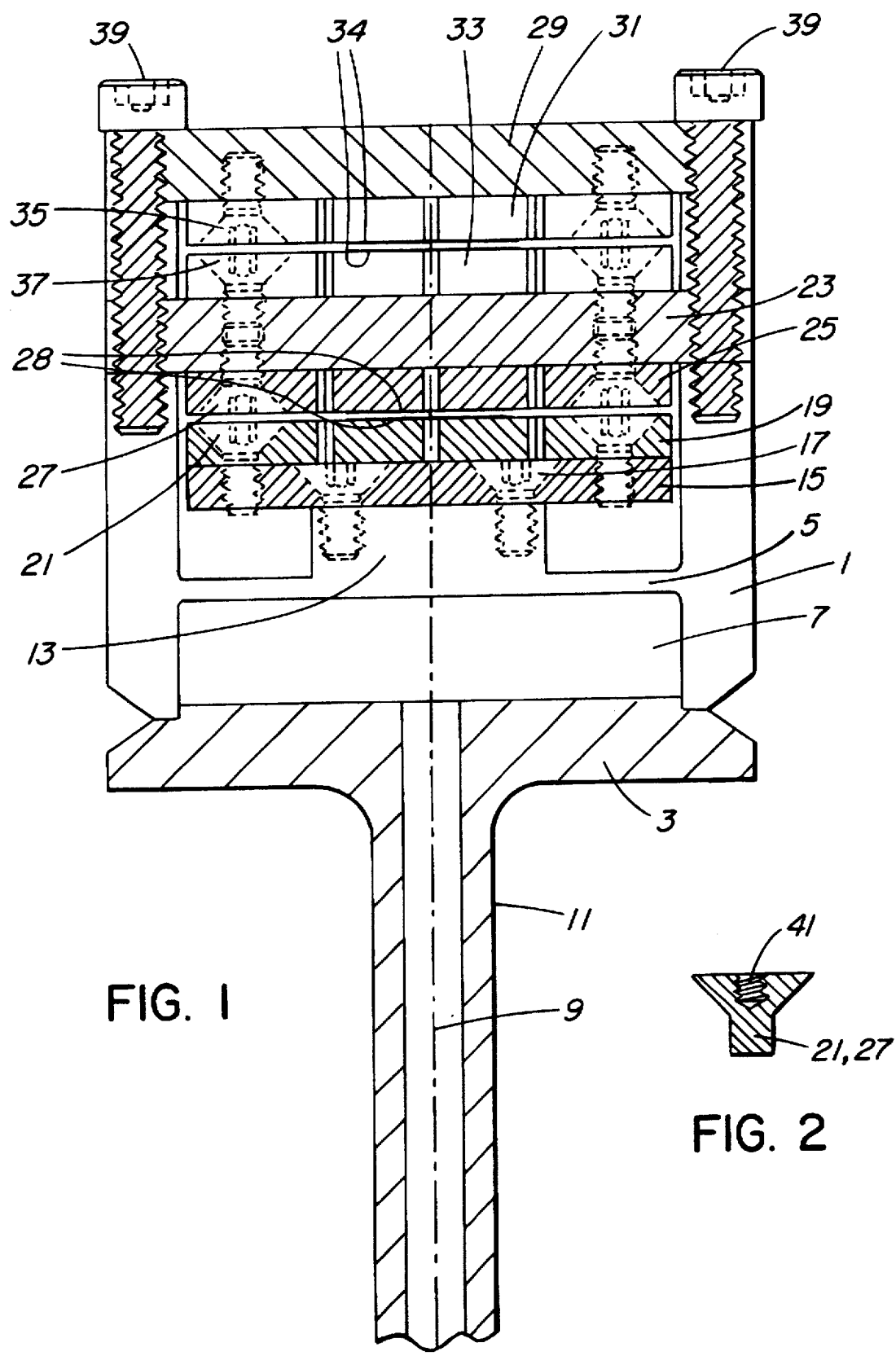

The device is preferably formed in a closed container, for example formed of a cylinder having an end cap 3. Closure of the opposite end of the cylinder will be described later.

A diaphragm 5 is supported by the walls of the cylinder, forming a plenum 7 with the end cap 3. An inlet 9 extends through a tube 11 which connects to the end cap 3, the tube extending through and into the plenum.

In operation, the tube is in communication with a tank containing fluid the pressure of which is to be measured. The pressure is extended through the inlet 9 to the plenum 7. As a result the diaphragm deflects with the pressure exerted on it from the plenum.

A preferably solid cylindrical block 13 extends upwardly from the central portion of the diaphragm, and as it is carried by the diaphragm, deflects with the diaphragm.

A rigid support 15, which has dimensions such as to extend close to, but not touching the walls of the cylinder 1, is fixed to the block 13, e.g. by flat head screws 17. A rigid capacitor plate support 19, which can be a printed circuit board, is fixed to and supported by support 15, e.g. by flat head screws 21.

An upper rigid cap 23 is fixed to and closes the top of the cylinder 1. A second capacitor plate support 25 is fixed to the bottom of the upper rigid cap 23, e.g. by flat head screws 27. The second capacitor plate support can be a printed circuit board.

Each of the printed circuit boards carries a thin copper coating 28, the coatings facing each other forming a capacitor.

Thus when diaphragm 5 deflects, block 13 moves with it, carrying support 15, capacitor plate support 19, and its copper coating. This causes the space between the copper coatings to vary, varying the capacitance, and thus providing a value of pressure which can be read using an electronic circuit for determining a value related to the capacitance.

A second cylinder 29 having one closed end, is fixed to the first cylinder 1 with its open end toward the rigid cap 23. Preferably the second cylinder is fixed by means of screws 35 which pass through the walls of cylinder 29 and rigid cap 23 into the walls of cylinder 1.

A pair of opposing capacitor plate supports 31 and 33 are respectively fixed to the second cylinder 29 and the upper side of rigid cap 23 within a cavity formed by the interior of the second cylinder and the end cap. Preferably the capacitor plate supports 31 and 33 are fixed by means of flat-head screws 35 and 37. Capacitor plate supports 31 and 33 are preferably formed of printed circuit boards, and carry mutually facing thin copper coatings 34. Copper coatings 34 form the plates of a compensating capacitor.

Of course the capacitor plates should be insulated from their immediate supports, e.g. by having their supports 33, 31, 25 and 19 formed of insulating material such as a printed circuit board, typically formed of fiberglass material.

Leads, not shown, are connected from outside the cylinder to coatings 28 and 34. The manner of connecting the leads to a circuit is not the subject of the present invention, but suffice to say the measuring and the compensating capacitors can be included in arms of a bridge circuit the balance of which is measured.

In order to have high accuracy, it is preferred that the mass of the support structure for capacitor plate 28, i.e., the combination of the diaphragm 5, solic cylindrical block 13, the support 15 and the capacitor plate support 19 should be as close as possible to the mass of the support structure for capacitor plate 34, i.e., the closed end of the second cylinder 29, capacitor plate supports 31 and screws 35. Thus movements caused by variations in temperature will affect the measuring capacitor formed of conductive coatings 28 to a similar degree as the compensating capacitor formed of conductive coatings 34.

In the prior art structure described in the aforenoted patent, capacitor plate movements caused by temperature variation will affect the measuring capacitor to a significantly greater degree than the compensating capacitor, since the masses affected by the temperatures are very different.

In accordance with another embodiment, one or both of the screws 21 and 27 are adjusted so as to protrude slightly toward each other, while still fastening the capacitor plate supports to the supports 15 and cap 23. In the event the diaphragm is deflected so strongly toward the opposite capacitor plate that it is in danger of creeping or becoming distorted, screws 21 and 27 form a guard or stop, which stops further movement of the diaphragm toward the opposite capacitor plate. Thus short circuiting of the plates 28, creep and distortion of the diaphragm is avoided.

FIG. 2 illustrates a crossection of either or all of screws 21 and 27 in accordance with another embodiment. In this case, each screw head contains a threaded insert 41. By screwing the insert inward or outward of the screw, a guard or block is formed, which bear against each other if the diaphragm is deflected to an undesired degree.

The cylinders can have an inside diameter of about 1 inch, and the diaphragm can have a thickness of 0.050 inches (1.27 mm). The spacing between the capacitor plates of both measuring and reference or compensating capacitors can be about 0.00125 inches, nominal, producing a capacitance of about 7.5 picofarads. The material used throughout, in a prototype of the invention, was titanium, although the invention is not limited thereto. A pressure of 24 bar produced a deflection of the diaphragm of 0.00047 (12μm) and a stress level of 16 ksi. A pressure of 48 bar produced a deflection of 0.00094 inches (24μm) and a stress level of 32 ksi. The guards or stops were set so that pressure of more than 48 bar caused a deflection to a degree causing the guards to contact, thus providing an alternative load path and limiting the maximum stress of the diaphragm to the pressure value of 32 ksi.

A person understanding this invention may now conceive of alternative structures and embodiments or variations of the above. All those which fall within the scope of the claims appended hereto are considered to be part of the present invention.

I claim:

1. A capacitive pressure transducer comprising a first capacitor having a plate which is movable under the influence of pressure and a fixed plate, and a second capacitor having a pair of fixed plates, one plate of the second capacitor and the fixed plate of the first capacitor being fixed to a common support, a first structure for moving the movable plate, a support structure for supporting a second plate of the second capacitor, mass of the support structure for supporting the second plate and mass of the first structure for moving the movable plate being approximately equal, and further including protrusions extending toward each other from the common support of one of the plates of the first capacitor and from the structure for moving the movable plates, the protrusions having a gap therebetween of predetermined dimension prior to deflection of the diaphragm, and located so as to bear against one another so as to inhibit further deflection of the diaphragm once the diaphragm has been deflected a predetermined distance.

2. A transducer as defined in claim 1 in which the protrusions are adjustable relative to each other along a common axis.

3. A capacitive pressure transducer comprising a first capacitor having a plate which is movable under the influence of pressure and a fixed plate, and a second capacitor having a pair of fixed plates, one plate of the second capacitor and the fixed plate of the first capacitor being fixed to a common support, a first structure for moving the movable plate, a support structure for supporting a second plate of the second capacitor, mass of the support structure for supporting the second plate and mass of the first structure for moving the movable plate being approximately equal, and further including protrusions extending with a gap from one of the common support and the structure for moving the movable plate toward the other of the common support and the structure for moving the movable plate, the gap being of predetermined dimension prior to deflection of the diaphragm, the gap closing so as to inhibit further deflection of the diaphragm once the diaphragm has been deflected a predetermined distance.

4. A transducer as defined in claim 3 in which said protrusions are adjustable orthogonally relative to a plane of said support of the other of the plates.

5. A transducer as defined in claim 2 in which the protrusions are screws.

6. A transducer as defined in claim 4 in which the protrusions are screws.

7. A capacitive pressure transducer comprising a sealed container, a diaphragm sealed to and supported by sides of the container defining a closed plenum region between the diaphragm and an end wall of the container, a fluid inlet to said plenum, a first fixed support supported by sides of the container parallel to the diaphragm on a side opposite to the plenum, a first pair of adjacent capacitor plates facing each other and fixed to the first fixed support and the diaphragm, and a second pair of adjacent capacitor plates of similar size as the first pair of capacitor plates facing each other and supported by the first fixed support and a second end wall of the container opposite said first wall, mass of structure supporting a capacitor plate of the first pair of plates adjacent the plenum being approximately equal to mass of structure supporting a capacitor plate of the second pair supported by said second end wall of the container, and further including protrusions extending toward each other from means supported by the diaphragm and from the first fixed support, the protrusions having a gap therebetween of predetermined dimension prior to deflection of the diaphragm, and located so as to bear against one another so as to inhibit further deflection of the diaphragm once the diaphragm has been deflected a predetermined distance.

8. A capacitive pressure transducer comprising a sealed container, a diaphragm sealed to and supported by sides of the container defining a closed plenum region between the diaphragm and an end wall of the container, a fluid inlet to said plenum, a first fixed support supported by sides of the container parallel to the diaphragm on a side opposite to the plenum, a first pair of adjacent capacitor plates facing each other and fixed to the first fixed support and the diaphragm, and a second pair of adjacent capacitor plates of similar size as the first pair of capacitor plates facing each other and supported by the first fixed support and a second end wall of the container opposite said first wall, mass of structure supporting a capacitor plate of the first pair of plates adjacent the plenum being approximately equal to mass of structure supporting a capacitor plate of the second pair supported by said second end wall of the container, and further including gapped protrusions extending from one of the common support of and the structure for moving the movable plate, toward the other of the common support and the structure for moving the movable plate, the gap being of predetermined dimension prior to deflection of the diaphragm, the gap closing so as to inhibit further deflection of the diaphragm once the diaphragm has been deflected a predetermined distance.

9. A capacitive pressure transducer comprising a sealed container, a diaphragm sealed to and supported by sides of the container defining a closed plenum region between the diaphragm and an end wall of the container, a fluid inlet to said plenum, a first fixed support supported by sides of the container parallel to the diaphragm on a side opposite to the plenum, a first pair of adjacent capacitor plates facing each other and fixed to the first fixed support and the diaphragm, and a second pair of adjacent capacitor plates of similar size as the first pair of capacitor plates facing each other and supported by the first fixed support and a second end wall of the container opposite said first wall, mass of structure supporting a capacitor plate of the first pair of plates adjacent the plenum being approximately equal to mass of structure supporting a capacitor plate of the second pair of plates supported by said second end wall of the container, the container being comprised of a first cylinder portion, said structure supporting the capacitor plate fixed to the diaphragm comprising a cylindrical block extending upwardly from a central portion of the diaphragm, and a rigid circular support fixed to the top of the block having a diameter slightly less than an interior diameter of the cylinder, the periphery of the rigid cylindrical support being physically isolated from interior walls of the cylinder, and a capacitor plate support to which a capacitor plate is adherent fixed to the rigid cylindrical support;

said structure supporting a capacitor plate supported by said second end wall of the container being comprised of a closed end wall of a second cylinder portion, said second cylinder portion being inverted and having its cylinder walls fixed to cylinder walls of said first cylinder portion, and a capacitor plate support to which a capacitor plate is adjacent being fixed to said second end wall in a cavity contained within the second cylinder portion.

10. A transducer as defined in claim 9 including a rigid circular cap fixed between and dividing interiors between the first and second cylinder portions, capacitor plate supports on which capacitor plates are adherent being fixed to opposite sides of the rigid circular cap, whereby gaps of predetermined dimensions are provided between facing pairs of capacitor plates.

11. A transducer as defined in claim 10 including protrusions extending toward each other from supports of the plates of the first capacitor, the protrusions having a gap therebetween of predetermined dimensions prior to deflection of the diaphragm, and located so as to bear against each other so as to inhibit further deflection of the diaphragm once the diaphragm has been deflected a predetermined distance.

12. A transducer as defined in claim 10 including protrusions extending from a support of one of the plates of the first capacitor toward the other, the protrusions having a gap with a support of the other of the plates of the first capacitor, the gap being of predetermined dimensions prior to deflection of the diaphragm, and bearing against said support of the other of the plates so as to inhibit further deflection of the diaphragm once the diaphragm has been deflected a predetermined distance.

13. A transducer as defined in claim 11 in which the protrusions are screws.

14. A transducer as defined in claim 12 in which the protrusions are screws.

* * * * *